(12) United States Patent
Bartella et al.

(10) Patent No.: US 12,692,699 B2
(45) Date of Patent: *Jul. 28, 2026

(54) FRAMED LAMINATED FIBERGLASS PANEL AND METHOD OF MANUFACTURE

(71) Applicant: CertainTeed Canada, Inc., Woodbridge (CA)

(72) Inventors: Luigi Bartella, Toronto (CA); Srirathakrishna Sivapathasuntharam, Woodbridge (CA); Michael J. Lembo, Souderton, PA (US)

(73) Assignee: CertainTeed Canada, Inc., Woodbridge (CA)

( * ) Notice: Subject to any disclaimer, the term of this patent is extended or adjusted under 35 U.S.C. 154(b) by 6 days.

This patent is subject to a terminal disclaimer.

(21) Appl. No.: 18/739,006

(22) Filed: Jun. 10, 2024

(65) Prior Publication Data

US 2024/0328156 A1      Oct. 3, 2024

Related U.S. Application Data

(63) Continuation of application No. 17/377,013, filed on Jul. 15, 2021, now Pat. No. 12,006,683.

(Continued)

(51) Int. Cl.
*E04B 9/04*          (2006.01)
*B32B 3/08*          (2006.01)
(Continued)

(52) U.S. Cl.
CPC ............. *E04B 9/0428* (2013.01); *B32B 3/08* (2013.01); *B32B 3/30* (2013.01); *B32B 5/02* (2013.01);
(Continued)

(58) Field of Classification Search
CPC ... E04B 49/0428; E04B 49/45; G10K 11/168; B32B 3/30; B32B 3/08; B32B 5/02;
(Continued)

(56) References Cited

U.S. PATENT DOCUMENTS

| | | | |
|---|---|---|---|
| 4,428,454 A | 1/1984 | Capaul | |
| 4,438,613 A | 3/1984 | Hintsa | |

(Continued)

FOREIGN PATENT DOCUMENTS

RU          2501918 C1     12/2013

*Primary Examiner* — Forrest M Phillips
(74) *Attorney, Agent, or Firm* — McDonnell Boehnen Hulbert & Berghoff LLP

(57)          ABSTRACT

The present disclosure relates generally to fiberglass panels, for example, suitable for acoustic ceiling surfaces. The present disclosure relates more particularly to an acoustic panel having a top surface, a bottom surface, and a perimeter edge. The acoustic panel includes a layered fiberglass panel body including a core fiberglass layer and a high density fiberglass layer secured to a lower face of the core fiberglass layer. The high density fiberglass layer has a higher density than the core fiberglass layer. The layered fiberglass panel body includes an outward projection at the perimeter edge of the acoustic panel that is formed by the high density fiberglass layer and a portion of the core fiberglass layer. A supporting perimeter frame extends around the outer edge of the core fiberglass layer, and the outward projection of the layered fiberglass panel body extends outward beneath the supporting perimeter frame.

23 Claims, 7 Drawing Sheets

Related U.S. Application Data

(60) Provisional application No. 63/052,307, filed on Jul. 15, 2020.

(51) Int. Cl.

| | |
|---|---|
| *B32B 3/30* | (2006.01) |
| *B32B 5/02* | (2006.01) |
| *B32B 5/26* | (2006.01) |
| *B32B 7/02* | (2019.01) |
| *B32B 7/12* | (2006.01) |
| *G10K 11/168* | (2006.01) |

(52) U.S. Cl.
CPC .................. *B32B 5/26* (2013.01); *B32B 7/02* (2013.01); *B32B 7/12* (2013.01); *E04B 9/045* (2013.01); *G10K 11/168* (2013.01); *B32B 2262/101* (2013.01); *B32B 2307/102* (2013.01); *B32B 2307/72* (2013.01); *B32B 2419/00* (2013.01)

(58) Field of Classification Search
CPC .... B32B 5/26; B32B 7/02; B32B 7/12; B32B 2262/101; B32B 2307/102; B32B 2307/72; B32B 2419/00
See application file for complete search history.

(56) References Cited

U.S. PATENT DOCUMENTS

| | | | | |
|---|---|---|---|---|
| 4,548,010 | A | 10/1985 | Hintsa | |
| 4,901,485 | A | 2/1990 | Menchetti | |
| 5,115,616 | A | 5/1992 | Nixon | |
| 6,499,262 | B1 | 12/2002 | Pinchot | |
| 10,029,628 | B2 | 7/2018 | Sim | |
| 10,457,225 | B2 | 10/2019 | Guigner | |
| 10,655,341 | B2 | 5/2020 | Hascher | |
| 11,459,753 | B2 | 10/2022 | Mcgee | |
| 11,753,550 | B2 | 9/2023 | Li | |
| 12,006,683 | B2 * | 6/2024 | Bartella | B32B 3/06 |
| 2007/0193131 | A1 | 8/2007 | Ortiz | |
| 2008/0050565 | A1 | 2/2008 | Gross | |
| 2011/0183096 | A1 * | 7/2011 | Lembo | B29C 65/48 |
| | | | | 428/36.5 |
| 2020/0024844 | A1 * | 1/2020 | Jacek | E04B 9/001 |
| 2020/0270861 | A1 * | 8/2020 | Bartella | E04B 9/001 |
| 2022/0018125 | A1 * | 1/2022 | Bartella | B32B 3/06 |
| 2023/0235622 | A1 | 7/2023 | Hashimoto | |

* cited by examiner

FRAMED LAMINATED FIBERGLASS PANEL AND METHOD OF MANUFACTURE

CROSS-REFERENCE TO RELATED APPLICATIONS

This application is a continuation of U.S. patent application Ser. No. 17/377,013, filed Jul. 15, 2021, which claims the benefit of U.S. Provisional Patent Application No. 63/052,307, filed Jul. 15, 2020, each of which is hereby incorporated herein by reference in its entirety.

BACKGROUND OF THE DISCLOSURE

1. Field of the Disclosure

The present disclosure relates generally to fiberglass panels, for example, suitable for acoustic ceiling surfaces. The present disclosure relates more particularly to panels including a fiberglass panel body supported by a perimeter frame attached to the outer edge of panel body.

2. Technical Background

Certain fiberglass panels provide excellent acoustic performance. Accordingly, such panels are desirable for various construction products. For example, because of their ability to be manufactured with high noise reduction coefficients, fiberglass panels make excellent ceiling panels. The panels can be secured to a ceiling grid and positioned adjacent to one another in order to form a continuous ceiling surface. Alternatively, the panels can be hung individually in certain areas of an indoor space in order to enhance the acoustic performance of the space.

A typical fiberglass panel may include a body formed of a fiberglass material and a supporting frame that surrounds the fiberglass component. The fiberglass that forms most of the panel often has a very low density and may be delicate. Accordingly, some fiberglass panels include a high density fiberglass layer on the visible side of the panels. The high density fiberglass layer is often attached to the framed fiberglass component using an adhesive. The adhesive is applied between the high density fiberglass layer and the other fiberglass component and allowed to set. Once the adhesive cures the fiberglass panel may be handled for further processing and transport.

The present inventors have recognized that many adhesives that are advantageous for providing a durable and strong bond between the fiberglass layers have long working times. As a result, after the panels are assembled they should be set aside to wait as the adhesive sets. Thus, the present inventors have recognized that a fiberglass panel that can be further processed and handled soon after assembly would be desirable to manufacturers.

SUMMARY OF THE DISCLOSURE

In one aspect, the present disclosure provides an acoustic panel having a top surface, a bottom surface, and a perimeter edge, the acoustic panel comprising:
  a layered fiberglass panel body comprising:
    a core fiberglass layer including an upper face, a lower face, and an outer edge, and
    a high density fiberglass layer secured to the lower face of the core fiberglass layer, the high density fiberglass layer having a higher density than the core fiberglass layer, wherein the layered fiberglass panel body includes an outward projection at the perimeter edge of the acoustic panel that is formed by the high density fiberglass layer and a portion of the core fiberglass layer; and
  a supporting perimeter frame extending around the outer edge of the core fiberglass layer,
  wherein the outward projection of the layered fiberglass panel body extends outward beneath the supporting perimeter frame.

In another aspect, the disclosure provides a method of manufacturing an acoustic panel according to the disclosure, the method comprising:
  attaching a high density fiberglass layer to a core fiberglass layer so as to form a layered fiberglass panel body, wherein a density of the high density fiberglass layer is higher than a density of the core fiberglass layer;
  machining the layered fiberglass panel body so as to form a countered outer edge; and
  surrounding the outer edge of the layered fiberglass panel body with a supporting perimeter frame.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that conventional fiberglass panels may be subject to relative movement between the components soon after assembly unless they are handled with great care. The present inventors have determined that a fiberglass panel that can be further processed and handled soon after assembly would be desirable to manufacturers.

Accordingly, one aspect of the disclosure is an acoustic panel having a top surface, a bottom surface, and a perimeter edge. The acoustic panel includes a layered fiberglass panel body including a core fiberglass layer including an upper face, a lower face, and an outer edge, and a high density fiberglass layer secured to the lower face of the core fiberglass layer. The high density fiberglass layer has a higher density than the core fiberglass layer. The layered fiberglass panel body includes an outward projection at the perimeter edge of the acoustic panel that is formed by the high density fiberglass layer and a portion of the core fiberglass layer. A supporting perimeter frame extends around the outer edge of the core fiberglass layer, and the outward projection of the layered fiberglass panel body extends outward beneath the supporting perimeter frame.

Figure 1:
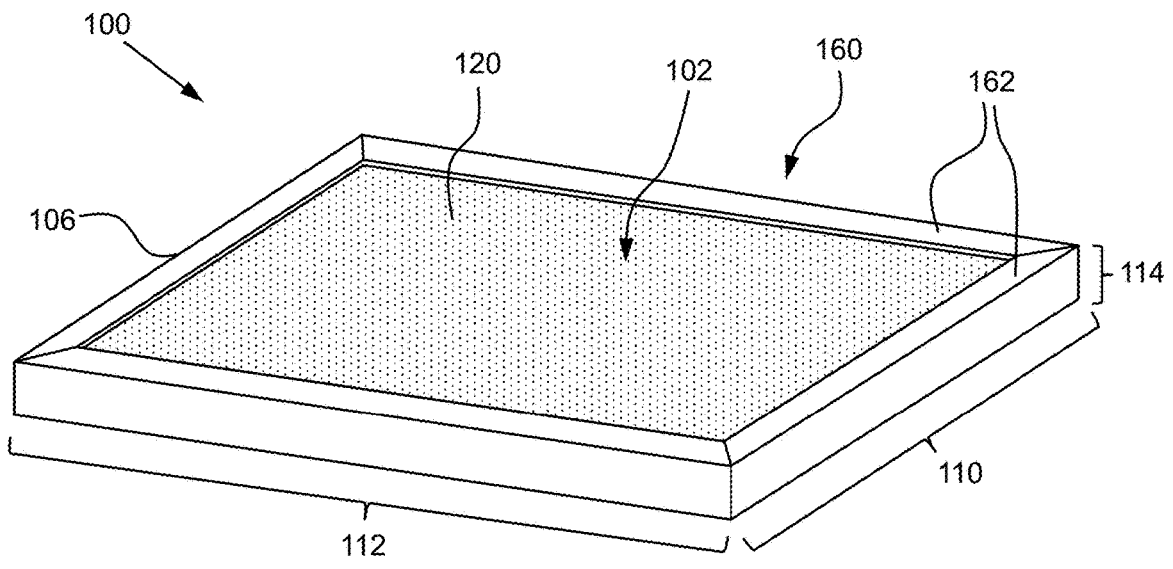
FIG. 1 is a schematic perspective view of an acoustic panel according to an embodiment of the disclosure.

Such an acoustic panel is shown in perspective view in FIG. 1. Acoustic panel 100 a top surface 102, a bottom surface 104 opposite top surface 102, and a perimeter edge 106 that extends circumferentially around acoustic panel 100. Acoustic panel 100 also has a length 110, a width 112, and a thickness 114, as described in further detail below. Acoustic panel 100 is configured to provide a ceiling surface where the bottom surface 104 forms the visible surface of acoustic panel 100 and the top surface and bottom surface are aligned with gravity. However, in other embodiments the acoustic panel may be installed with a different orientation, such that the surfaces identified herein as the top surface and bottom surface are not aligned with gravity. For example, in some embodiments, the acoustic panel is installed vertically with the bottom surface being the visible surface and the top surface being positioned behind the visible bottom surface.

Acoustic panel 100 also includes a layered fiberglass panel body 120 that is surrounded by a supporting perimeter frame 160. Components of layered fiberglass panel body 120 can be seen more clearly in the cross sectional view of FIG. 2, which shows a portion of acoustic panel 100 at perimeter edge 106. The interaction between layered fiberglass panel body 120 and supporting perimeter frame 160 is also more clearly shown in FIG. 2. Layered fiberglass panel body includes a core fiberglass layer 130 including an upper face 132, a lower face 134, and an outer edge 136. Layered fiberglass panel body 120 also includes a high density fiberglass layer 140 secured to lower face 134 of core fiberglass layer 130. An outward projection 124 is formed at the outer edge 122 of layered fiberglass panel body 120 toward the bottom of the layered fiberglass panel body 120. The outward projection 124 includes a portion of core fiberglass layer 130 and the high density fiberglass layer 140.

The supporting perimeter frame 160 of acoustic panel 100 extends around the outer edge 136 of core fiberglass layer 130. However, as shown in the cross-section of FIG. 2, at the perimeter edge 106 of acoustic panel 100, the outward projection 124 of layered fiberglass panel body 120 extends outward beneath supporting perimeter frame 160. In particular, the portion of outward projection 124 formed by high density fiberglass layer 140 extends as far outward as any portion of supporting perimeter frame 160. Accordingly, the outward projection 124 extends all the way to the perimeter edge 106 of acoustic panel 100 and covers supporting perimeter frame 160 on the visible side of the acoustic panel. Using the outward projection 124 of layered fiberglass panel body 120 to cover the perimeter frame 160 can effectively obscure the perimeter frame 160 so that is not visible. While other acoustic panels cover the associated frame with a veil, the frame is often still visible through the veil, a phenomenon referred to as "ghosting." The outward projection can obscure the perimeter frame without the need for multiple layers of veil or other specialized coverings.

In certain embodiments of the acoustic panel as otherwise described herein, the high density fiberglass layer extends to the perimeter edge of the acoustic panel around an entire circumference of the acoustic panel. For example, in some embodiments, the high density fiberglass layer covers the supporting perimeter frame around the entirety of the acoustic panel. In other words, in some embodiments the area of the high density fiberglass layer is at least as large as the "foot print" or surface area covered by the supporting perimeter frame, such that no portion of the supporting perimeter frame extends laterally outward in the length or width direction compared to the high density fiberglass layer. In such embodiments, the supporting perimeter frame is entirely visually obscured when the bottom surface of the acoustic pane is viewed.

In some embodiments, the high density fiberglass layer has a thickness of at least 0.05 inches, e.g., at least 0.07 inches, e.g. at least about 0.08 inches. Further in some embodiments, the high density fiberglass layer has a thickness of no more than 0.20 inches, e.g., no more than 0.15 inches, e.g., no more than 0.12 inches. The high density fiberglass layer may have another thickness. In some embodiments, the high density fiberglass layer is formed as a single uniform sheet. In other embodiments, the high density fiberglass layer is formed of a plurality of fiberglass sheets, such as 2-5 fiberglass sheets.

In certain embodiments of the acoustic panel as otherwise described herein, an outer edge of the high density fiberglass layer forms part of the outward projection. For example, because the outward projection 124 is positioned at the bottom surface 104 of acoustic panel 100, the high density fiberglass layer 140 forms the lowest part of outward projection 124. Thus, the high density fiberglass layer 140 makes up the portion of outward projection 124 that extends furthest in the lateral or outward direction.

In certain embodiments of the acoustic panel as otherwise described herein, an outer edge of the high density fiberglass layer is angled. For example, the outward projection 124 of layered fiberglass panel body 120 continues to advance outward at an angle toward the bottom surface 104 of acoustic pane 100. This angled shape of the outward projection 124 continues in the high density fiberglass layer 140, such that the outer edge 146 of the high density fiberglass layer 140 is cut at an angle. In particular, with respect to a cross section that is perpendicular to the perimeter edge 106 of the acoustic panel 100, the outer edge 146 and lower face 144 of high density fiberglass layer 140 form an acute angle while the outer edge 146 and the upper face 142 of high density fiberglass layer 140 form an obtuse angle.

In certain embodiments of the acoustic panel as otherwise described herein, the outer edge of the high density fiberglass layer is attached to the supporting perimeter frame. For example, outer edge 146 of high density fiberglass layer 140 is secured to the lower portion of supporting perimeter frame 106. In some embodiments, the high density fiberglass layer is secured to the supporting perimeter frame using an adhesive, such as a white glue.

In certain embodiments of the acoustic panel as otherwise described herein, the portion of the core fiberglass layer that forms part of the outward projection is adjacent to the lower face of the core fiberglass layer. For example, the outward projection 124 of layered fiberglass panel body 120 is positioned at the bottom surface 104 of acoustic panel 100 and is formed by both the high density fiberglass layer 140 and a portion of core fiberglass layer 130 adjacent to the lower face 134 of the core fiberglass layer 130. Accordingly, the lower end of the supporting perimeter frame 160 is obscured by both the high density fiberglass layer 140 as well as a portion of the core fiberglass layer 130. This added thickness of the portion of the layered fiberglass panel body 120 that extends over the supporting perimeter frame 160 can help reduce shadows and reflections caused by the supporting perimeter frame 160, which might otherwise be visible if the supporting perimeter frame were covered by the high density fiberglass layer alone.

In certain embodiments of the acoustic panel as otherwise described herein, the portion of the core fiberglass layer that forms part of the projection is angled. For example, the outward projection 124 of layered fiberglass panel body 120 includes an angled surface 138 on the outer edge 136 of core fiberglass layer 130. Angled surface 138 provides a gradual transition between the outward projection 124 and the rest of the core fiberglass layer 130. Likewise, angled surface 138 also cooperates with the corresponding shape of the supporting perimeter frame 160, as explained in more detail below.

In certain embodiments of the acoustic panel as otherwise described herein, the high density fiberglass layer is laminated to the core fiberglass layer. For example, in some embodiments, the upper face 142 of high density fiberglass layer 140 is secured directly to lower face 134 of core fiberglass layer 130. In other embodiments, the high density fiberglass layer is indirectly secured to the core fiberglass layer. For example, in some embodiments, an additional layer is provided between the high density fiberglass layer and the core fiberglass layer.

As explained in more detail below, the high density fiberglass layer and core fiberglass layer can be attached using adhesive, can be bonded together, or attached by other means.

Figure 2:
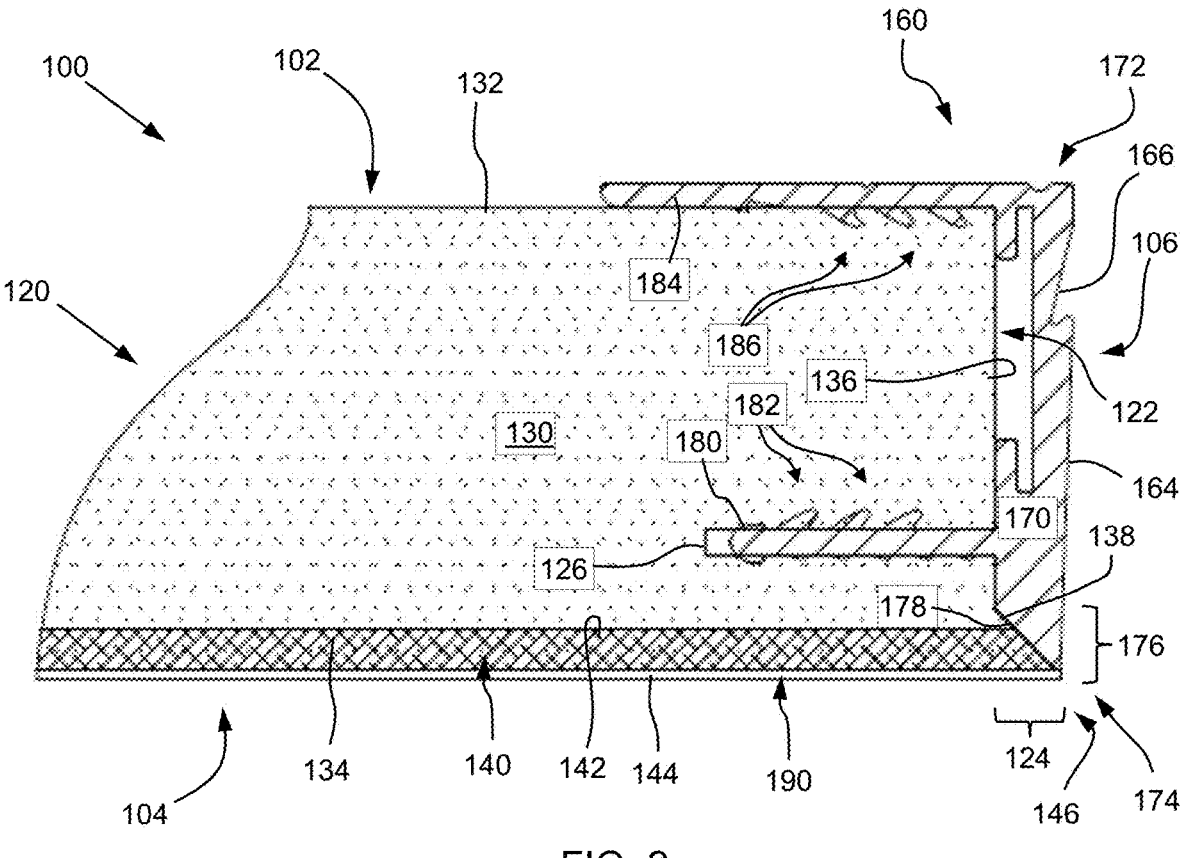
FIG. 2 is a schematic cross-sectional view of a portion of the acoustic panel of FIG. 1.

In certain embodiments of the acoustic panel as otherwise described herein, the perimeter frame includes a vertical web extending along the perimeter edge of the acoustic panel from a top end to a bottom end, and wherein the bottom end of the vertical web tapers to a reduced thickness. For example, perimeter frame 160 of acoustic panel 100 extends around the circumference of the layered fiberglass panel body 120 and includes a vertical web 170 that surrounds the outer edge 122 of layered fiberglass panel body 120. With respect to the cross section of perimeter frame 160, as shown in FIG. 2, vertical web 170 extends along the perimeter edge 106 of acoustic panel 106 from a top end 172 that is at the top surface of acoustic panel 100 to bottom end 174 near the bottom surface of acoustic panel 100. Accordingly, vertical web 170 forms the bulk of perimeter edge 106 of acoustic panel 100. Further, vertical web 170 includes a tapered portion 176 that tapers to a reduced thickness at the bottom end 174 of vertical web 170. The reduced thickness of tapered portion 176 reduces the visibility of perimeter frame 160 from below, while maintaining structural support for the outer edge 122 of layered fiberglass panel body 120.

In certain embodiments of the acoustic panel as otherwise described herein, a portion of the inner surface of the vertical web at the bottom end of the vertical web is angled toward the perimeter edge of the acoustic panel so as to provide the reduced thickness. For example, the outer surface of vertical web 170 of acoustic panel 100 extends along a straight at any given cross section. To provide the tapered portion 176, the inner surface of vertical web 170 toward the lower end 174 thereof, diverts from a vertical line to an angled surface 178 that extends toward the perimeter edge 106 of acoustic panel 100. As a result, the tapered portion 176 of vertical web 170 narrows to toward the bottom surface 104 of acoustic panel 100 where it forms a point. The angled surface 178 of vertical web 170 is configured to cooperate with the corresponding angled portion of outward projection 124 of layered fiberglass panel body 120 such that these parts fit together. In acoustic panel 100, the tapered portion 176 of vertical web 170 is angled at 45 degrees. However, in other embodiments, the vertical web tapers at another angle.

In certain embodiments of the acoustic panel as otherwise described herein, the perimeter frame includes an intermediate flange and the layered fiberglass panel body includes a slot that receives the intermediate flange. For example, perimeter frame 160 of acoustic panel 100 includes an intermediate flange 180 that extends inward from vertical web 170 and layered fiberglass panel body 120 includes a slot 126 configured to receive intermediate flange 180. In particular, core fiberglass layer 130 has a slot 126 that extends inward from outer edge 136 and intermediate flange 180 is positioned and sized to securely fit within slot 126. The intermediate flange 180 and slot 126 help strengthen the connection between perimeter frame 160 and layered fiberglass panel body 120. In some embodiments, an adhesive may be introduced into the slot before receiving the intermediate flange so as to fix the intermediate flange in the slot.

Furthermore, in some embodiments, the intermediate flange includes structural features that help retain the intermediate flange within the slot. For example, in some embodiments, the intermediate flange includes ridges that extend along the length of the perimeter frame. Such ridges engage with the inner surfaces of the slot hindering removal of the intermediate flange once it has been inserted.

In certain embodiments of the acoustic panel as otherwise described herein, the intermediate flange includes prongs that extend toward the top surface of the acoustic panel. For example, intermediate flange 180 of supporting perimeter frame 160 includes prongs 182 that extend upward toward the top surface 102 of acoustic panel 100. The prongs 182 include a sharp edge that faces outward. Accordingly, the prongs 182 pass over the fiberglass material as intermediate flange 180 is inserted into slot 126, but the sharp edges of the prongs 182 hinder removal of intermediate flange 180 from slot 126, and thus also hinder separation of supporting perimeter frame 160 and layered fiberglass panel body 120. In some embodiments prongs are only provided on the upper side of intermediate flange 182 and the lower side of intermediate flange 182 is free of any prongs. Limiting the prongs to the upper side of intermediate flange 182 prevents a scenario where prongs on the lower side might push the fiberglass material downward and forming a bump on the visible bottom surface 104 of acoustic panel 100.

In certain embodiments of the acoustic panel as otherwise described herein, the perimeter frame includes an upper arm that extends over the layered fiberglass panel body. For example, perimeter frame 160 of acoustic panel 100 includes an upper arm 184 that extends inward from the top end 172 of vertical web 170. The upper arm 184 and vertical web 170 are disposed substantially perpendicular to one another similar to angle stock, which strengthen the members of the supporting perimeter frame 160. Further, the upper arm 184 extends over the layered fiberglass panel body 120 against the upper face 132 of core fiberglass layer 130. Accordingly, upper arm 184 provides additional surface for securing the supporting perimeter frame 160 to the layered fiberglass panel body 120. Moreover, upper arm 184 can also provide a surface for securing fasteners to suspend acoustic panel 100 from a support structure, such as a structural ceiling.

In certain embodiments of the acoustic panel as otherwise described herein, the upper arm includes prongs that extend toward the bottom surface of the acoustic panel. For example, upper arm 184 includes prongs 186 that extend downward toward bottom surface 104 of acoustic panel 100. Similar to prongs 182 on intermediate flange 180, the prongs 186 on upper arm 184 enhance the engagement between supporting perimeter frame 160 and layered fiberglass panel body 120. Moreover, because prongs 182 and 186 are disposed between intermediate flange 180 and upper arm 180, the fiberglass material engaged by the prongs is sandwiched between these lateral structures of the supporting perimeter frame 160, which prevents the fiberglass material from being pushed upward or downward and forming bumps on the surfaces of the acoustic panel 100.

In certain embodiments of the acoustic panel as otherwise described herein, the acoustic panel further includes a veil at the bottom surface of the acoustic panel covering the high density fiberglass layer. For example, the bottom surface 1024 of acoustic panel 100 is formed by a veil 190 that covers the high density fiberglass layer 140. Veil 190 forms the visible surface of acoustic panel 100 when viewed from below such that the remainder of acoustic panel 100 is hidden. In some embodiments the veil is formed of a fabric or mat, such as a fiberglass mat, that is air permeable. The veil provides the finished appearance of the bottom surface of the acoustic panel. Accordingly, the color and reflectance of the veil provides visual characteristics to the acoustic panel. In some embodiments, the veil has at thickness of at least 0.005 inches, e.g., at least 0.010 inches, e.g., at least 0.015 inches. Further, in some embodiments, the veil has a thickness of no more than 0.040 inches, e.g., no more than 0.030 inches, e.g., no more than 0.025 inches.

In certain embodiments as otherwise described herein, the panel has a length of at least 1 ft., e.g., a length of at least 2 ft., e.g., about 2 ft., about 3 ft., about 4 ft., about 5 ft., about 6 ft., about 7 ft., about 8 ft., about 9 ft., or about 10 ft. In certain embodiments, the panel has a length of no more than 20 ft. e.g., no more than 10 ft. For example, in some embodiments, the panel has a length in a range from 1 ft. to 20 ft., e.g., in a range from 2 ft. to 10 ft., e.g., about 2 ft., about 3 ft., about 4 ft., about 5 ft., about 6 ft., about 7 ft., about 8 ft., about 9 ft., or about 10 ft.

In certain embodiments as otherwise described herein, the panel has a width of at least 1 ft., e.g., a length of at least 2 ft., e.g., about 2 ft., about 3 ft., about 4 ft., about 5 ft., about 6 ft., about 7 ft., about 8 ft., about 9 ft., or about 10 ft. In certain embodiments, the panel has a width of no more than 10 ft. For example, in some embodiments, the panel has a width in a range from 1 ft. to 10 ft.

A wide range of combinations of length and width of the acoustic panel are possible. The term length and width, as used herein, are not confined to any particular shape of the fiberglass panel. The term length is used to identify the longest dimension of the panel along a surface of the panel and between parallel edges thereof. The term width is used to identify a direction that is perpendicular to the length and extends from one edge of the panel to another. For example, the length and width of a circular panel are the same and the length and width dimensions are each measured from opposite sides of the panel where the opposing edges are parallel to one another.

Figure 5:
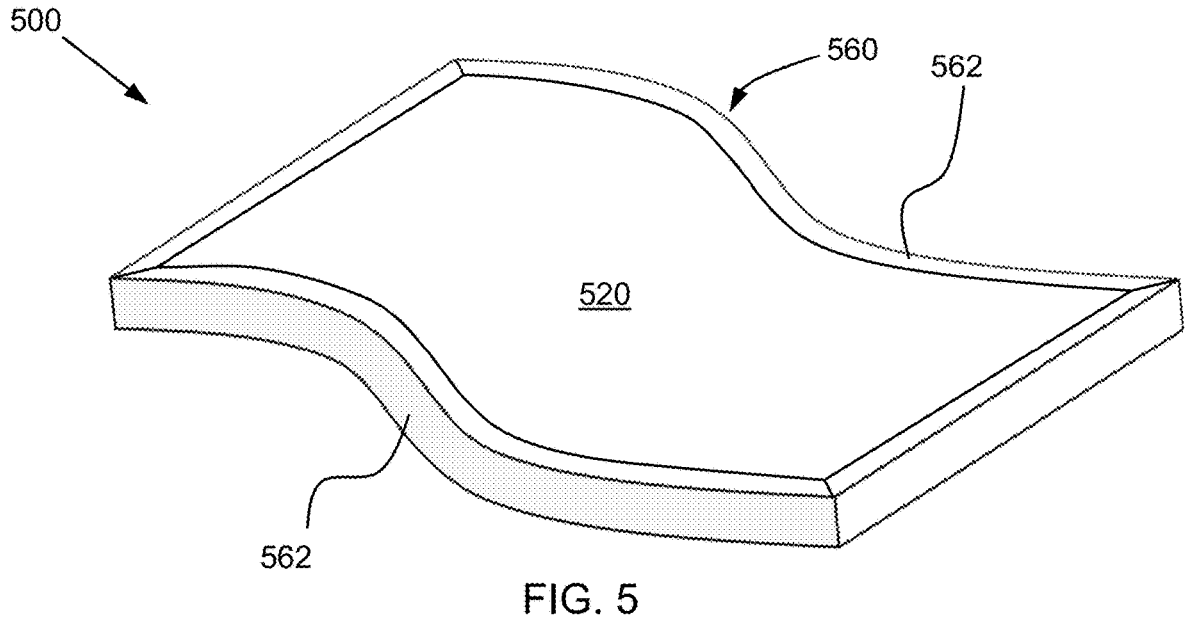
FIG. 5 is a schematic perspective view of an acoustic panel according to still another embodiment of the disclosure.

In certain embodiments of the acoustic panel as otherwise described herein, the panel has a thickness of at least 0.25 inches, e.g., at least 0.5 inches, e.g., at least 1 inch. In certain embodiments, the panel has a thickness of no more than 7 inches, e.g., no more than 5 inches, e.g., no more than 3 inches. For example, in some embodiments, the panel has a thickness in a range from 0.25 inches to 7 inches, e.g., 0.5 inches to 3 inches, e.g., 1 inch to 2.5 inches. The term thickness, as used herein, refers to the measurement through the fiberglass panel at a particular point on the surface of the panel. Thus, the term thickness does not incorporate the overall height dimension of the panel resulting from curvature in the surface of the panel. In other words, a curved panel (such as that shown in FIG. 5) may have an overall height dimension of several feet, while the dimension of the material at any particular point on the surface of the panel is only 1 inch. As the term is used herein, the thickness of such a panel would be 1 inch.

In certain embodiments of the acoustic panel as otherwise described herein, the panel has a noise reduction coefficient of at least 0.7, e.g., at least 0.8, e.g., at least 0.85. As used herein, a "noise reduction coefficient" or "NRC" describes the arithmetic average (e.g., rounded to the nearest multiple of 0.05), of the absorption coefficients for a specific panel determined at 250 Hz, 500 Hz, 1000 Hz, and 2000 Hz. The person of ordinary skill in the art will appreciate that an "absorption coefficient" of a panel may be determined through standardized testing procedures such as, for example, ASTM C423 ("Standard Test Method for Sound Absorption and Sound Absorption Coefficients by the Reverberation Room Method"). The person of ordinary skill in the art will further appreciate that, while intended to describe the fraction of randomly incident sound power absorbed by a surface, an absorption coefficient is defined operationally, and accordingly, highly absorptive panels can have an absorption coefficient exceeding unity at one or more frequencies.

In certain embodiments of the acoustic panel as otherwise described herein, the bottom surface of the panel has a light reflectance of at least 75%, e.g., at least 80%, e.g., about 90%. For example, in some embodiments, a veil disposed on the bottom surface provides the acoustic panel with a high reflectance. In other embodiments, the bottom surface of the acoustic panel may be tinted white, for example by paint. On the other hand, in other embodiments, the acoustic panel may have other decorative characteristics and have a lower light reflectance. For example, in some embodiments, the bottom surface of the acoustic panel is dark and has low light reflectance.

In certain embodiments of the acoustic panel as otherwise described herein, the supporting perimeter frame includes a plurality of frame members. For example, in some embodiments, the supporting perimeter frame includes two or more frame members that are positioned to surround the layered fiberglass panel body. Further, in some embodiments, the frame members are configured to join one another so as to create a frame that extends around the entire circumference of the acoustic panel. For example, acoustic panel 100 includes four frame member 162 that surround the entire layered fiberglass panel body 120 around the outer edge, as shown in FIG. 1. The frame members 162 are joined to one another by miter joints at the corners of the acoustic panel 100. In other embodiments, the frame members do not fully surround the circumference of the layered fiberglass panel body. For example, in some embodiments, gaps in the supporting perimeter frame are provided around the circumference of the acoustic panel.

In certain embodiments of the acoustic panel as otherwise described herein, each of the frame members is formed of an aluminum alloy. Other materials are also possible. For example, in some embodiments, the supporting perimeter frame is made of steel. Further, in some embodiments the supporting perimeter frame is made of wood, plastic, or a composite material.

In certain embodiments of the acoustic panel as otherwise described herein, each of the frame members is an extruded member. For example, in some embodiments, the frame members are extruded aluminum structures. In some embodiments, as a result of the extrusion of the frame members, the cross section of each frame members is substantially uniform along the length of the frame member.

Figure 3:
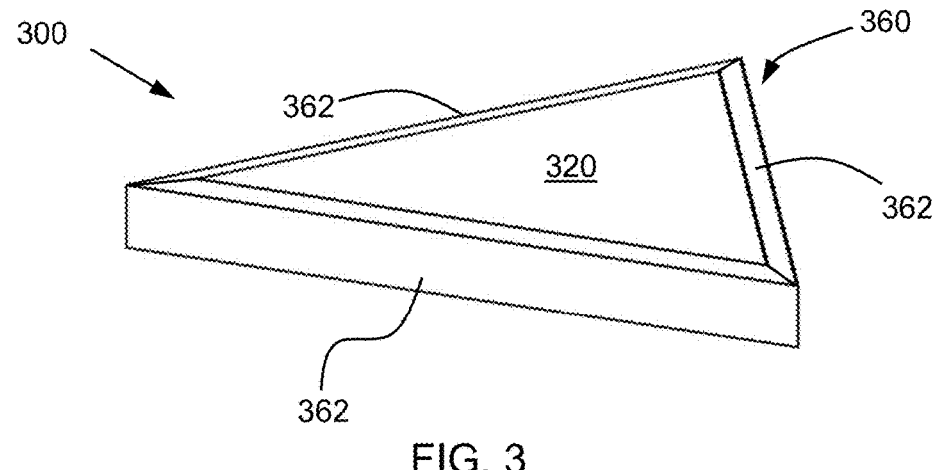
FIG. 3 is a schematic perspective view of an acoustic panel according to another embodiment of the disclosure.

In certain embodiments of the acoustic panel as otherwise described herein, the frame members are straight, and wherein the acoustic panel has a polygonal shape. For example, each of the frame members 162 of supporting perimeter frame 160 are straight and joined at miter joints, such that acoustic panel 100 has the shape of a rectangular. Likewise, FIG. 3 shows another embodiment of such an acoustic panel. Acoustic panel 300 includes a supporting perimeter frame 360 with three frame members 362 that surround the layered fiberglass panel body 320. The three frame members 362 are each straight and are coupled to each other by miter joints having an angle of 60 degrees, such that acoustic panel 300 has the shape of a triangle. As will be appreciated by those of ordinary skill in the art, acoustic panels having additional frame members are also possible so as to form polygons with a greater number of sides.

Figure 4:
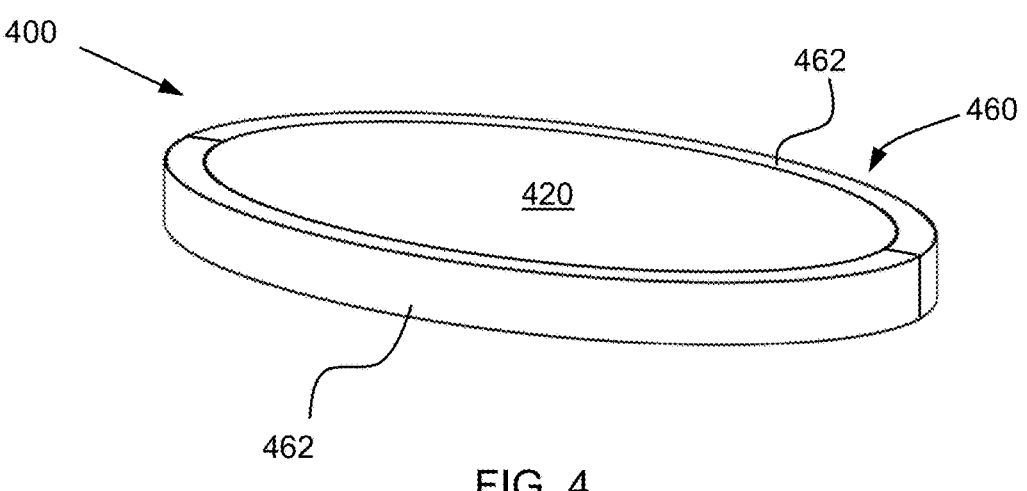
FIG. 4 is a schematic perspective view of an acoustic panel according to yet another embodiment of the disclosure.

In certain embodiments of the acoustic panel as otherwise described herein, the frame members are curved, and wherein the panel body has a curved edge. Such an acoustic panel is shown in FIG. 4. Acoustic panel 400 includes a supporting perimeter frame 460 that includes curved frame members 462 that extend around the perimeter of layered fiberglass panel body 420. The shape of layered fiberglass panel body 420 and the corresponding shape of acoustic panel 400 is elliptical. In other embodiments, the fiberglass panel has other curved shapes, such as rounded squares, circles, ovals or irregular curved shapes. Further, in some embodiments the frame includes both curved and straight frame members.

In certain embodiments of the acoustic panel as otherwise described herein, the panel is planar. For example, the top surface 102 and bottom surface 104 of acoustic panel 100 are both flat surfaces resulting in a planar acoustic panel. Likewise, the top surface and the bottom surface of acoustic panel 300 are also flat, such that acoustic panel 300 is also planar. Acoustic panel 400 is similarly planar. In other embodiments, the panel has a curved contour. For example, acoustic panel 500, shown in FIG. 5, has a curved contour including an upper region that slopes down to a lower region. To accommodate such a contour, both the layered fiberglass panel body 520 and two of the frame members 562 of the supporting perimeter frame 560 are curved. While acoustic panel 500 only curves along length of the panel, such that two of the frame members are straight, in other embodiments all of the frame members of the supporting perimeter frame may be curved, and the acoustic panel can be curved along both the length and the width.

In certain embodiments of the acoustic panel as otherwise described herein, the core fiberglass layer has a density of at least 0.5 lbs. per cubic foot, e.g., at least 2 lbs. per cubic foot, e.g., at least 3 lbs. per cubic foot, e.g., at least 5 lbs. per cubic foot density. Further, in certain embodiments of the acoustic panel as otherwise described herein, the core fiberglass layer has a density of no more than 20 lbs. per cubic foot, e.g., no more than 15 lbs. per cubic foot, e.g., no more than 10 lbs. per cubic foot, e.g., no more than 8 lbs. per cubic foot. For example, in some embodiments the core fiberglass layer has a density in a range from 0.5 to 15 lbs. per cubic foot, e.g., 1.5 to 10 lbs. per cubic foot, e.g., 2.25 to 7 lbs. per cubic foot, e.g., 3 to 6 lbs. per cubic foot, e.g., 3 to 4.5 lbs. per cubic foot or a density in a range from 2 to 20 lbs. per cubic foot, e.g., 4 to 15 lbs. per cubic foot, e.g., 5 to 10 lbs. per cubic foot, e.g., 6 to 7 lbs. per cubic foot. In some embodiments, the density of the high density fiberglass layer is at least twice the density of the core fiberglass layer, e.g., at least three times the density of the core fiberglass layer, e.g., at least five times the density of the core fiberglass layer.

In certain embodiments of the acoustic panel as otherwise described herein, an outer surface of the perimeter frame includes a groove configured to receive a tool for removing the acoustic panel from a ceiling grid. For example, the outer surface 164 of perimeter frame 160 includes a groove 166 that extends along the length of each frame member of the perimeter frame 150. The groove 166 serves as an engagement structure for receiving a tool configured to move acoustic panel 100, in particular to remove acoustic panel 100 from a ceiling grid. For example, a blade removal tool may be used to pull acoustic panel 100 out of the ceiling grid. The blade removal tool may include a hook that is inserted into the groove, such that when the tool is pulled downward, acoustic panel 100 can be dislodged from the ceiling grid. In some embodiments, the groove can have a sharp lower edge. For example, groove 166 includes a sharp edge toward the bottom surface 104 of acoustic panel 100, which securely engages with the hook of the blade removal tool.

In certain embodiments of the acoustic panel as otherwise described herein, the outer surface of the perimeter frame is angled inward toward the bottom surface of the acoustic panel. For example, outer surface 164 of perimeter frame 160 is angled slightly inward from groove 166 to the bottom surface 104 of acoustic panel 100. This slight angle can provide a small gap between two adjacent acoustic panels, allowing a removal tool to be inserted between the acoustic panels to reach the groove 166. In other embodiments, the outer surface of the perimeter frame is perpendicular to the top and bottom surfaces of the acoustic panel.

In another aspect, the disclosure provides a method of manufacturing an acoustic panel according to the disclosure. The method includes attaching a high density fiberglass layer to a core fiberglass layer so as to form a layered fiberglass panel body, where the density of the high density fiberglass layer is higher than the density of the core fiberglass layer. The layered fiberglass panel body subsequently machined so as to form a countered outer edge, which is then surrounded with a supporting perimeter frame.

Such a method is illustrated in FIGS. 6 to 11, which shows steps involved in forming acoustic panel 100 of FIGS. 1 and 2. The steps shown in FIGS. 6-11 are carried out with the components in an inverted orientation compared to FIG. 2, such that the acoustic panel shown in FIG. 11 has the upper arm 184 at the bottom of the image and the veil 190 is being applied to the bottom face 144 of high density fiberglass layer 140 at the top of the image. In other embodiments, the steps of the method of manufacturing the acoustic panel are carried out in another orientation, such as the orientation shown in FIGS. 1 and 2. Likewise, in some embodiments the orientation of the components of the acoustic panel change during the manufacturing method.

Figure 6:
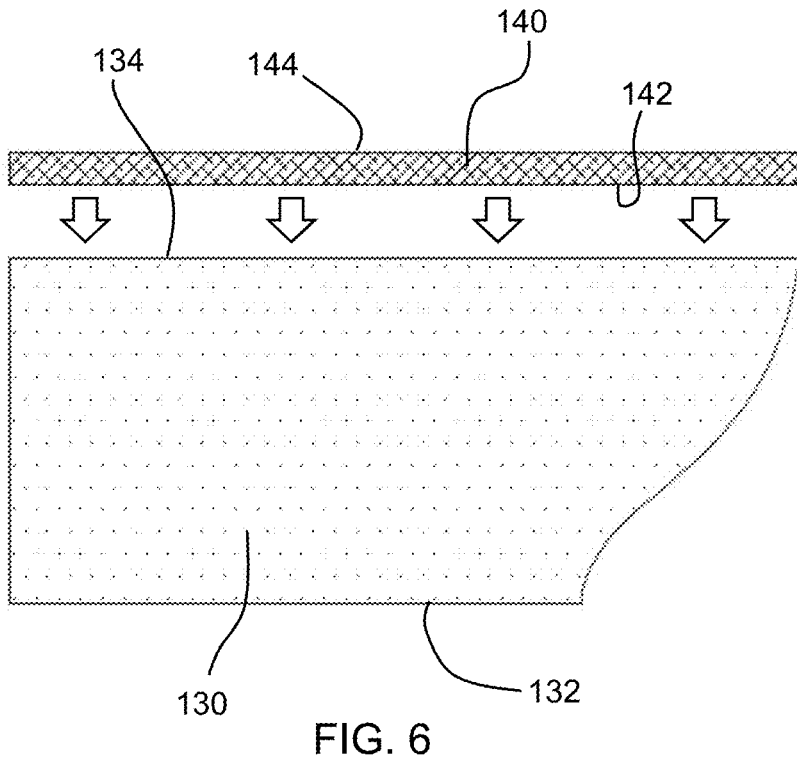
FIG. 6 illustrates a step in a method of manufacturing an acoustic panel according to an embodiment of the disclosure.
Figure 7:
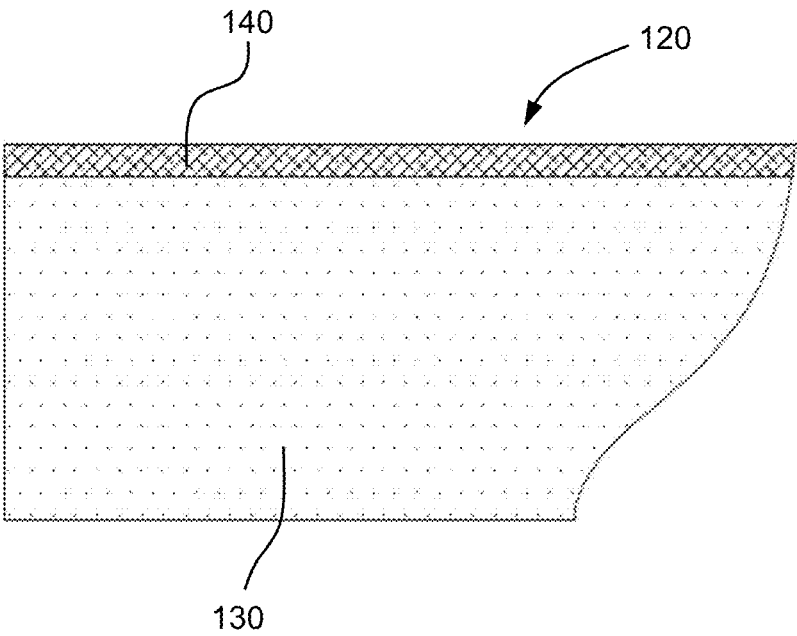
FIG. 7 is a schematic cross-sectional view of a portion of a layered fiberglass structure created according to FIG. 6.

FIG. 6 illustrates the high density fiberglass layer 140 being laminated to the core fiberglass layer 130 to form the layered fiberglass panel body 120 shown in FIG. 7. In particular, FIG. 6 shows the upper face 142 of high density fiberglass layer 140 being attached to the lower face 134 of core fiberglass layer 130, which leaves the lower face 144 of high density fiberglass layer 140 and the upper face 132 of core fiberglass layer 130 exposed.

In some embodiments, the high density fiberglass layer is attached to the core fiberglass layer using a layer of adhesive. In other embodiments, the high density fiberglass layer is bonded to the core fiberglass layer. For example, in some embodiments, a bond is formed between the high density fiberglass layer and core fiberglass layer through a heating process. Still, in some embodiments, one of the core fiberglass layer or the high density fiberglass layer is formed directly on the other layer.

In some embodiments, a large high density fiberglass layer is laminated to a similarly large core fiberglass layer, which are subsequently cut to size for forming an acoustic panel. In other embodiments, the core fiberglass layer and high density fiberglass layer are laminated when they are substantially the same size as the finished acoustic panel.

Figure 8:
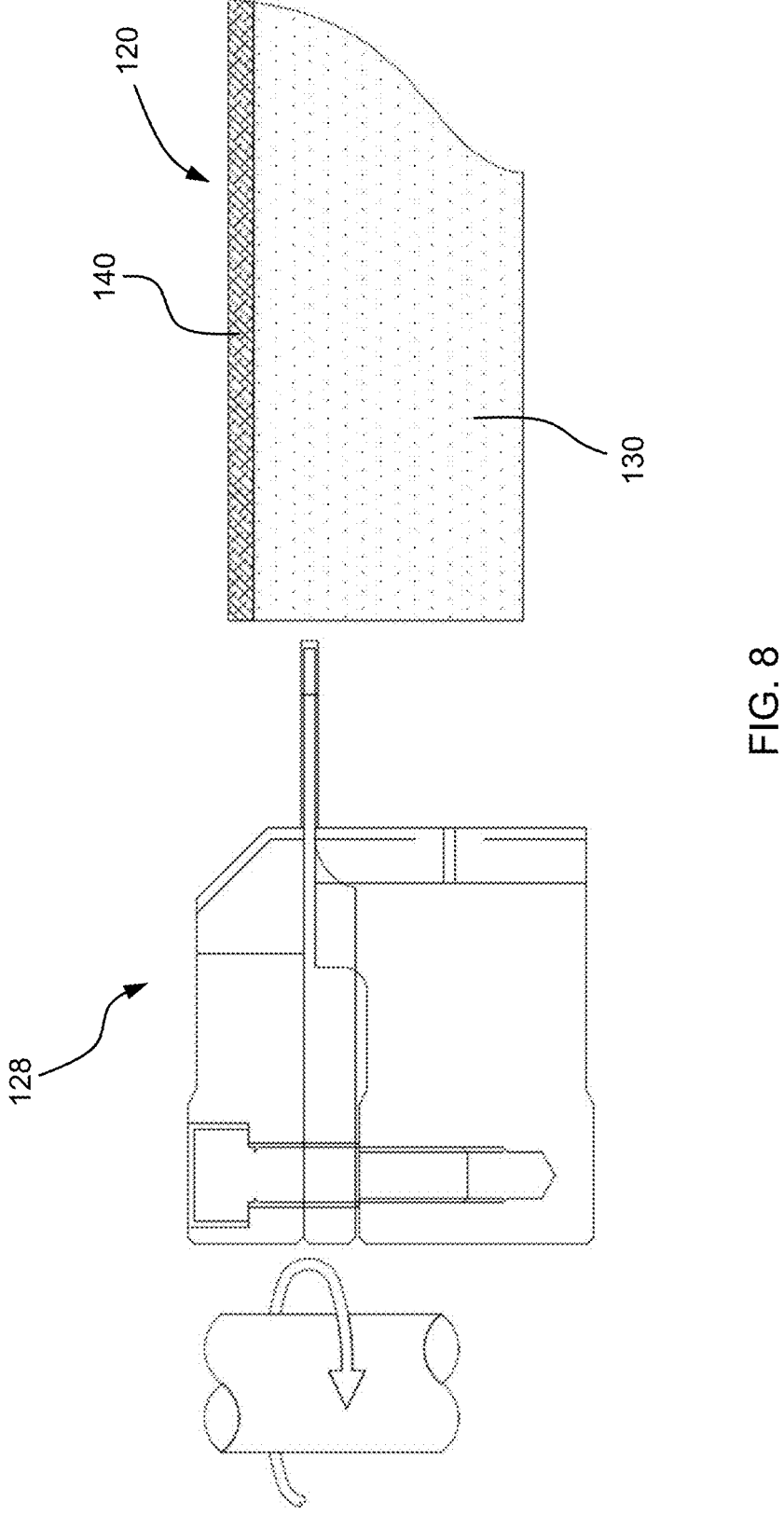
FIG. 8 illustrates another step in a method of manufacturing an acoustic panel according to an embodiment of the disclosure.
Figure 9:
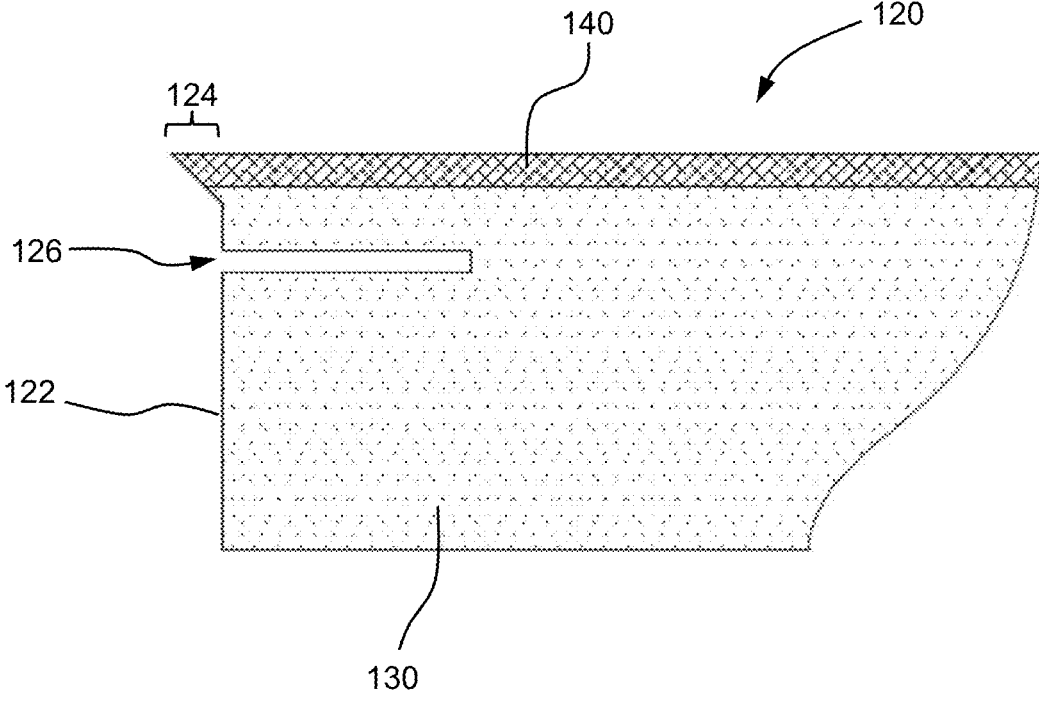
FIG. 9 is a schematic cross-sectional view of a layered fiberglass panel body created according to FIG. 8.

As shown in FIG. 8, the layered fiberglass panel body 120 is then machined to form a contoured outer edge 122, as shown in FIG. 9. For example, in some embodiments, the high density fiberglass layer 140 and the core fiberglass layer 130 are machined in the same operation to remove fiberglass material in order to form the contoured outer edge 122. For example, contoured outer edge 122 is machined using mechanical tool, such as a shaper 128, as shown in FIG. 8. In other embodiments, the contoured outer edge is machined using a laser cutter, or another method for removing material.

Figure 10:
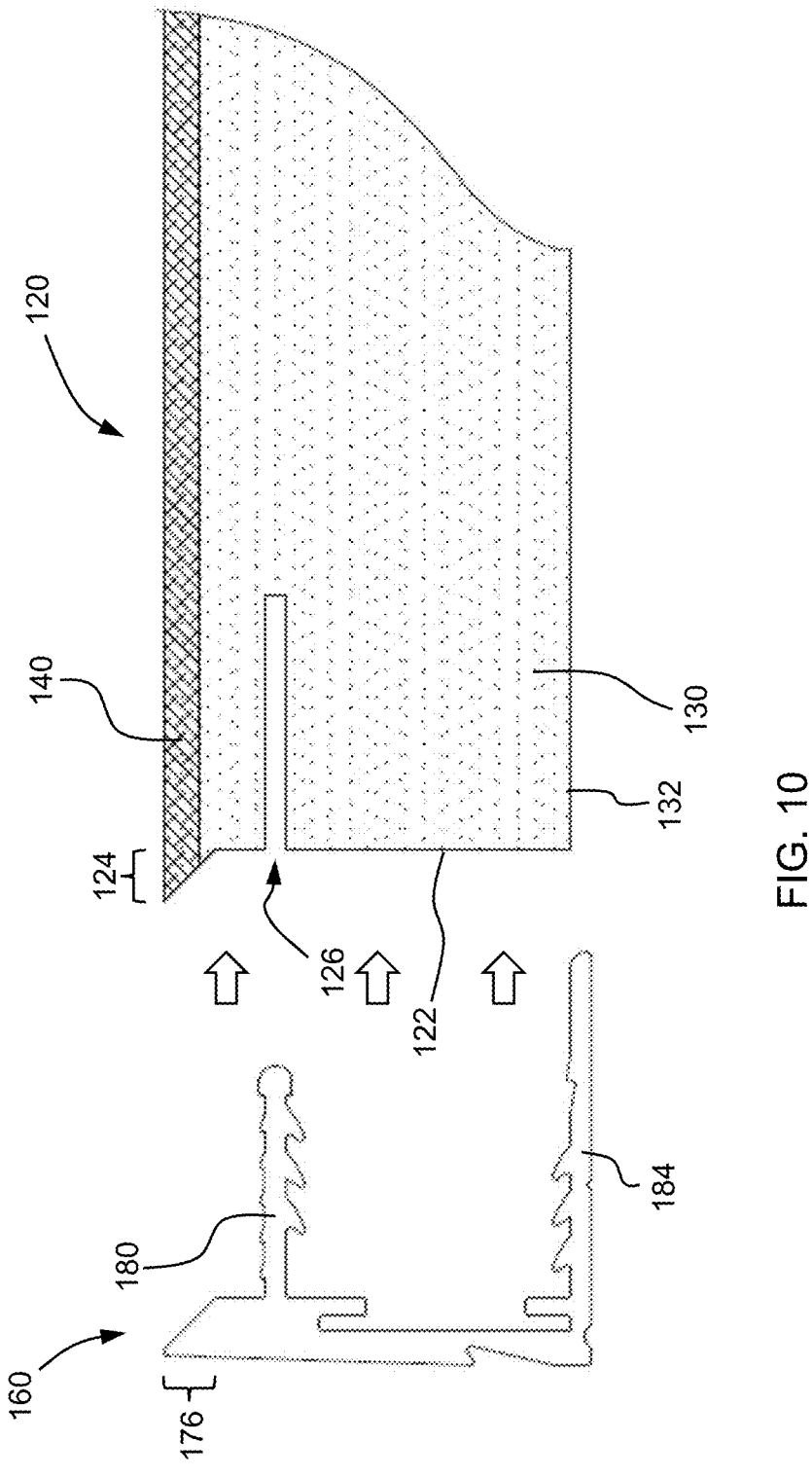
FIG. 10 illustrates another step in a method of manufacturing an acoustic panel according to an embodiment of the disclosure.

Once the contoured outer edge 122 of the layered fiberglass panel body 120 is formed, the supporting perimeter frame 160 is attached to the outer edge 122 so as to surround the layered fiberglass panel body, as shown in FIG. 10. In some embodiments, an adhesive, such as a white glue, is placed between the supporting perimeter frame and the layered fiberglass panel body before the supporting perimeter frame is secured into place. The adhesive may assist in holding the supporting perimeter frame in place. In other embodiments, the supporting perimeter frame is held in place without the use of adhesives.

Laminating the high density fiberglass layer to the core fiberglass layer before securing the supporting perimeter frame to the fiberglass avoids the need to wait for adhesive or glue to set after the frame is in place. Accordingly, the acoustic panel can more quickly advance to further processing steps, which reduces costs.

Figure 11:
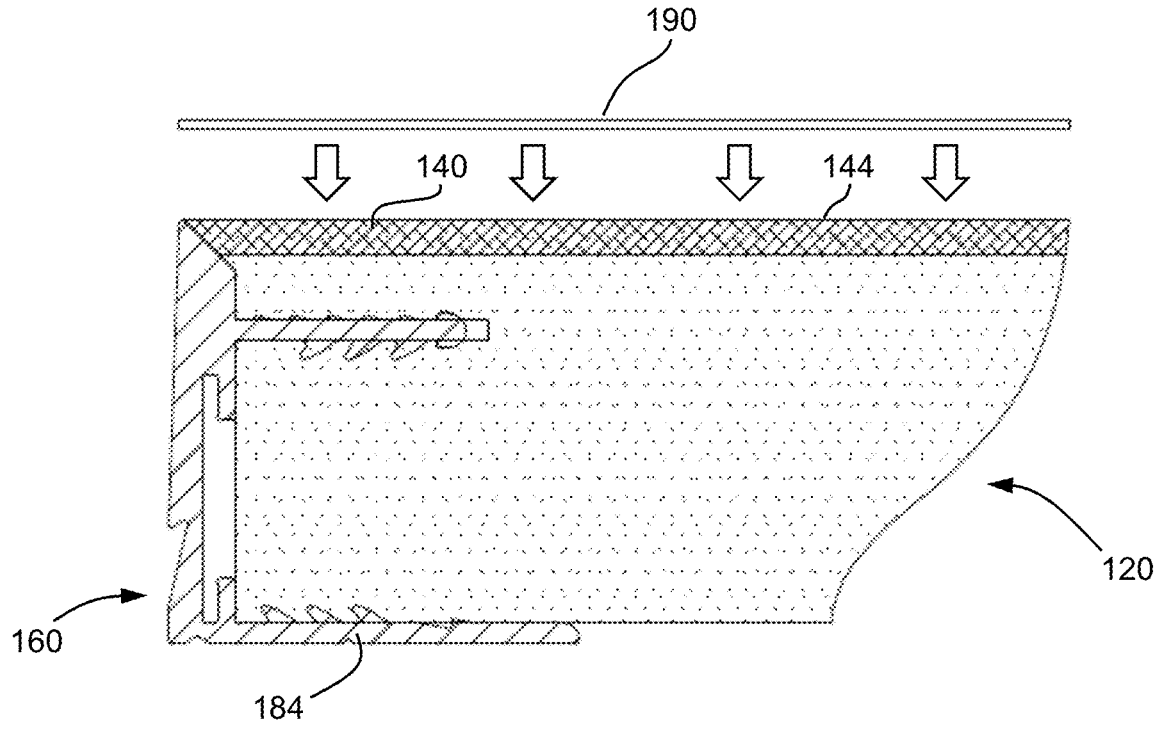
FIG. 11 illustrates another step in a method of manufacturing an acoustic panel according to an embodiment of the disclosure.

In certain embodiments of the method as otherwise described herein, the method further includes securing a veil to the high density fiberglass layer. For example, as shown in FIG. 11, after supporting perimeter frame 160 is secured to layered fiberglass panel body 120, a veil 190 is secured to the lower face 144 of high density fiberglass layer 140 in order to form the acoustic panel 100 shown in FIGS. 1 and 2.

In certain embodiments of the method as otherwise described herein, machining the layered fiberglass panel body includes providing the layered fiberglass panel body with an outward projection at a lower face of the layered fiberglass panel body. For example, as shown in FIG. 9, the machining step illustrated in FIG. 8 forms an outward projection 124 that includes a portion of core fiberglass layer 130 and high density fiberglass layer 140. The outward projection 124 is formed by machining the contoured profile 122 at an outwardly extending angle toward the lower face 144 of high density fiberglass layer 140.

In certain embodiments of the method as otherwise described herein, the method further includes securing the outward projection to the perimeter frame. For example, the outward projection 124 of layered fiberglass panel body 120 is secured to a tapered portion 176 of the vertical web of supporting perimeter frame 160. In some embodiments an adhesive is provided between the outward projection of the layered fiberglass panel body and the supporting perimeter frame before the perimeter frame and layered fiberglass panel body are connected.

In certain embodiments of the method as otherwise described herein, machining the layered fiberglass panel body includes providing the layered fiberglass panel body with a slot extending inward from the outer edge. In some embodiments, the method further includes inserting a flange of the supporting perimeter frame into the slot of the layered fiberglass panel body. For example, as shown in FIG. 9, the machining step illustrated in FIG. 8 forms a slot 126 in the contoured outer edge 122 of layered fiberglass panel body 120. Subsequently, as shown in FIG. 10, the intermediate flange 180 of supporting perimeter frame 160 is inserted into the slot 126 and assists in holding the supporting perimeter frame 160 on the layered fiberglass panel body 120. In some embodiments, an adhesive is used to aid in securing the intermediate flange in the slot. In other embodiments, no adhesive is used within the slot.

In certain embodiments of the method as otherwise described herein, the supporting perimeter frame includes a plurality of frame members. For example, in some embodiments, the supporting perimeter frame is formed by securing individual frame members to the outer edge of the layered fiberglass panel body, as shown in FIG. 10, around the circumference of the panel body. Collectively, the individual frame members form a supporting perimeter frame that gives the acoustic panel its structural integrity.

In certain embodiments of the method as otherwise described herein, surrounding the outer edge of the layered fiberglass panel body includes connecting the frame members. For example, in some embodiments the frame members are connected to one another at joints using brackets. For example, as shown in FIG. 1, the frame members 162 of supporting perimeter frame 160 are joined to one another with miter joints.

In certain embodiments of the method as otherwise described herein, the method further includes extruding the frame members. For example, in some embodiments, the frame members are extruded aluminum members. Accordingly, such frame members are substantially uniform along their length. In other embodiments, the frame members are formed by another method.

Various aspects and embodiments of the disclosure are further described by the enumerated embodiments below, which may be combined in any number and in any combination that is not technically or logically inconsistent.

Embodiment 1. An acoustic panel having a top surface, a bottom surface, and a perimeter edge, the acoustic panel comprising:

a layered fiberglass panel body comprising:

a core fiberglass layer including an upper face, a lower face, and an outer edge, and a high density fiberglass layer secured to the lower face of the core fiberglass layer, the high density fiberglass layer having a higher density than the core fiberglass layer, wherein the layered fiberglass panel body includes an outward projection at the perimeter edge of the acoustic panel that is formed by the high density fiberglass layer and a portion of the core fiberglass layer; and a supporting perimeter frame extending around the outer edge of the core fiberglass layer, wherein the outward projection of the layered fiberglass panel body extends outward beneath the supporting perimeter frame.

Embodiment 2. The acoustic panel according to Embodiment 1, wherein the outward projection extends to the perimeter edge of the acoustic panel.

Embodiment 3. The acoustic panel according to Embodiment 1 or Embodiment 2, wherein the high density fiberglass layer extends to the perimeter edge of the acoustic panel around an entire circumference of the acoustic panel.

Embodiment 4. The acoustic panel according to any of Embodiments 1 to 3, wherein an outer edge of the high density fiberglass layer forms part of the outward projection.

Embodiment 5. The acoustic panel according to Embodiment 4, wherein an outer edge of the high density fiberglass layer is angled.

Embodiment 6. The acoustic panel according to Embodiment 5, wherein the outer edge of the high density fiberglass layer is attached to the supporting perimeter frame.

Embodiment 7. The acoustic panel according to any of Embodiments 1 to 6, wherein the portion of the core fiberglass layer that forms part of the outward projection is adjacent to the lower face of the core fiberglass layer.

Embodiment 8. The acoustic panel according to Embodiment 7, wherein the portion of the core fiberglass layer that forms part of the projection is angled.

Embodiment 9. The acoustic panel according to any of Embodiments 1 to 8, wherein the high density fiberglass layer is laminated to the core fiberglass layer.

Embodiment 10. The acoustic panel according to any of Embodiments 1 to 9, wherein the perimeter frame includes a vertical web extending along the perimeter edge of the acoustic panel from a top end to a bottom end, and wherein the bottom end of the vertical web tapers to a reduced thickness.

Embodiment 11. The acoustic panel according to Embodiment 10, wherein a portion of the inner surface of the vertical web at the bottom end of the vertical web is angled toward the perimeter edge of the acoustic panel so as to provide the reduced thickness.

Embodiment 12. The acoustic panel according to any of Embodiments 1 to 11, wherein the perimeter frame includes an intermediate flange and the layered fiberglass panel body includes a slot that receives the intermediate flange.

Embodiment 13. The acoustic panel according to Embodiment 12, wherein the intermediate flange includes prongs that extend toward the top surface of the acoustic panel.

Embodiment 14. The acoustic panel according to any of Embodiments 1 to 13, wherein the perimeter frame includes an upper arm that extends over the layered fiberglass panel body.

Embodiment 15. The acoustic panel according to Embodiment 14, wherein the upper arm includes prongs that extend toward the bottom surface of the acoustic panel.

Embodiment 16. The acoustic panel according to any of Embodiments 1 to 15, further comprising a veil at the bottom surface of the acoustic panel covering the high density fiberglass layer.

Embodiment 17. The acoustic panel according to any of Embodiments 1 to 16, wherein the panel has a length of at least 1 ft., e.g., a length of at least 2 ft., e.g., about 2 ft., about 3 ft., about 4 ft., about 5 ft., about 6 ft., about 7 ft., about 8 ft., about 9 ft., or about 10 ft.

Embodiment 18. The acoustic panel according to any of Embodiments 1 to 17, wherein the panel has a length of no more than 20 ft., e.g., no more than 10 ft.

Embodiment 19. The acoustic panel according to any of Embodiments 1 to 18, wherein the panel has a width of at least 1 ft., e.g., a length of at least 2 ft., e.g., about 2 ft., about 3 ft., about 4 ft., about 5 ft., about 6 ft., about 7 ft., about 8 ft., about 9 ft., or about 10 ft.

Embodiment 20. The acoustic panel according to any of Embodiments 1 to 19, wherein the panel has a width of no more than 10 ft.

Embodiment 21. The acoustic panel according to any of Embodiments 1 to 20, wherein the panel has a thickness of at least 0.25 inches, e.g., at least 0.5 inches, e.g., at least 1 inch.

Embodiment 22. The acoustic panel according to any of Embodiments 1 to 21, wherein the panel has a thickness of no more than 7 inches, e.g., no more than 5 inches, e.g., no more than 3 inches.

Embodiment 23. The acoustic panel according to any of Embodiments 1 to 22, wherein the panel has a noise reduction coefficient of at least 0.7, e.g., at least 0.8, e.g., at least 0.85.

Embodiment 24. The acoustic panel according to any of Embodiments 1 to 23, wherein the bottom surface of the panel has a light reflectance of at least 75%, e.g., at least 80%, e.g., about 90%.

Embodiment 25. The acoustic panel according to any of Embodiments 1 to 24, wherein the supporting perimeter frame includes a plurality of frame members.

Embodiment 26. The acoustic panel according to Embodiment 25, wherein each of the frame members is formed of an aluminum alloy.

Embodiment 27. The acoustic panel according to Embodiment 25 or Embodiment 26, wherein each of the frame members is an extruded member.

Embodiment 28. The acoustic panel according to any of Embodiments 1 to 27, wherein the frame members are straight, and wherein the acoustic panel has a polygonal shape.

Embodiment 29. The acoustic panel according to any of Embodiments 1 to 28, wherein the frame members are curved, and wherein the panel body has a curved edge.

Embodiment 30. The acoustic panel according to any of Embodiments 1 to 29, wherein the panel is planar.

Embodiment 31. The acoustic panel according to any of Embodiments 1 to 30, wherein the panel has a curved contour.

Embodiment 32. The acoustic panel according to any of Embodiments 1 to 31, wherein the core fiberglass layer has a density of at least 0.5 lbs. per cubic foot, e.g., at least 2 lbs. per cubic foot, e.g., at least 3 lbs. per cubic foot, e.g., at least 5 lbs. per cubic foot density.

Embodiment 33. The acoustic panel according to any of Embodiments 1 to 32, wherein the core fiberglass layer has a density of no more than 20 lbs. per cubic foot, e.g., no more than 15 lbs. per cubic foot, e.g., no more than 10 lbs. per cubic foot, e.g., no more than 8 lbs. per cubic foot.

Embodiment 34. The acoustic panel according to any of Embodiments 1 to 33, wherein an outer surface of the perimeter frame includes a groove configured to receive a tool for removing the acoustic panel from a ceiling grid.

Embodiment 35. The acoustic panel according to Embodiment 34, wherein the outer surface of the perimeter frame is angled inward toward the bottom surface of the acoustic panel.

Embodiment 36. A method of manufacturing an acoustic panel according to any of Embodiments 1 to 32, the method comprising:

attaching a high density fiberglass layer to a core fiberglass layer so as to form a layered fiberglass panel body, wherein a density of the high density fiberglass layer is higher than a density of the core fiberglass layer;

machining the layered fiberglass panel body so as to form a countered outer edge; and surrounding the outer edge of the layered fiberglass panel body with a supporting perimeter frame.

Embodiment 37. The method according to Embodiment 36, further comprising securing a veil to the high density fiberglass layer.

Embodiment 38. The method according to Embodiment 36 or Embodiment 37, wherein machining the layered fiberglass panel body includes providing the layered fiberglass panel body with an outward projection at a lower face of the layered fiberglass panel body.

Embodiment 39. The method according to Embodiment 38, further comprising securing the outward projection to the perimeter frame.

Embodiment 40. The method according to any of Embodiments 36 to 39, wherein machining the layered fiberglass panel body includes providing the layered fiberglass panel body with a slot extending inward from the outer edge.

Embodiment 41. The method according to Embodiment 40, further comprising inserting an intermediate flange of the supporting perimeter frame into the slot of the layered fiberglass panel body.

Embodiment 42. The method according to any of Embodiments 36 to 41, wherein the supporting perimeter frame includes a plurality of frame members.

Embodiment 43. The method according to Embodiment 42, wherein surrounding the outer edge of the layered fiberglass panel body includes connecting the frame members.

Embodiment 44. The method according to Embodiment 42 or 43, further comprising extruding the frame members.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. An acoustic panel having a top surface, a bottom surface, and a perimeter edge, the acoustic panel comprising:

a layered fiberglass panel body comprising:

a core fiberglass layer including an upper face, a lower face, and an outer edge, and a high density fiberglass layer secured to the lower face of the core fiberglass layer, the high density fiberglass layer having a higher density than the core fiberglass layer, wherein the layered fiberglass panel body includes an outward projection at the perimeter edge of the acoustic panel that is formed by the high density fiberglass layer and a portion of the core fiberglass layer; and a supporting perimeter frame extending around the outer edge of the core fiberglass layer, wherein the outward projection of the layered fiberglass panel body extends outward beneath the supporting perimeter frame.

2. The acoustic panel according to claim 1, wherein the outward projection extends to the perimeter edge of the acoustic panel.

3. The acoustic panel according to claim 1, wherein the high density fiberglass layer extends to the perimeter edge of the acoustic panel around an entire circumference of the acoustic panel.

4. The acoustic panel according to claim 1, wherein an outer edge of the high density fiberglass layer forms part of the outward projection.

5. The acoustic panel according to claim 4, wherein an outer edge of the high density fiberglass layer is angled.

6. The acoustic panel according to claim 5, wherein the outer edge of the high density fiberglass layer is attached to the supporting perimeter frame.

7. The acoustic panel according to claim 1, wherein the portion of the core fiberglass layer that forms part of the outward projection is adjacent to the lower face of the core fiberglass layer.

8. The acoustic panel according to claim 7, wherein the portion of the core fiberglass layer that forms part of the projection is angled.

9. The acoustic panel according to claim 1, wherein the high density fiberglass layer is laminated to the core fiberglass layer.

10. The acoustic panel according to claim 1, wherein the perimeter frame includes a vertical web extending along the perimeter edge of the acoustic panel from a top end to a bottom end, and wherein the bottom end of the vertical web tapers to a reduced thickness.

11. The acoustic panel according to claim 10, wherein a portion of the inner surface of the vertical web at the bottom end of the vertical web is angled toward the perimeter edge of the acoustic panel so as to provide the reduced thickness.

12. The acoustic panel according to claim 1, wherein the perimeter frame includes an intermediate flange and the layered fiberglass panel body includes a slot that receives the intermediate flange.

13. The acoustic panel according to claim 12, wherein the intermediate flange includes prongs that extend toward the top surface of the acoustic panel.

14. The acoustic panel according to claim 1, wherein the perimeter frame includes an upper arm that extends over the layered fiberglass panel body.

15. The acoustic panel according to claim 14, wherein the upper arm includes prongs that extend toward the bottom surface of the acoustic panel.

16. The acoustic panel according to claim 1, further comprising a veil at the bottom surface of the acoustic panel covering the high density fiberglass layer.

17. The acoustic panel according to claim 1, wherein the supporting perimeter frame includes a plurality of frame members.

18. The acoustic panel according to claim 1, wherein an outer surface of the perimeter frame includes a groove configured to receive a tool for removing the acoustic panel from a ceiling grid.

19. The acoustic panel according to claim 18, wherein the outer surface of the perimeter frame is angled inward toward the bottom surface of the acoustic panel.

20. A method of manufacturing an acoustic panel according to claim 1, the method comprising:

attaching a high density fiberglass layer to a core fiberglass layer so as to form a layered fiberglass panel body, wherein a density of the high density fiberglass layer is higher than a density of the core fiberglass layer;

machining the layered fiberglass panel body so as to form a countered outer edge; and surrounding the outer edge of the layered fiberglass panel body with a supporting perimeter frame.

21. The acoustic panel according to claim 1, wherein the panel has a noise reduction coefficient of at least 0.7.

22. The acoustic panel according to claim 21, wherein the bottom surface of the panel has a light reflectance of at least 75%.

23. The acoustic panel according to claim 1, wherein the bottom surface of the panel has a light reflectance of at least 75%.

* * * * *